United States Patent Office 3,353,927
Patented Nov. 21, 1967

3,353,927
DISSOLVING ROCK SALT CONTAINING CALCIUM SULFATE IN THE PRESENCE OF AN ANIONIC ORGANIC WETTING AGENT
Paul H. Ralston, Bethel Park, Pa., assignor to Calgon Corporation, a corporation of Pennsylvania
No Drawing. Filed Nov. 15, 1961, Ser. No. 152,662
13 Claims. (Cl. 23—312)

This invention relates to the preparation of sodium chloride brines of high purity.

Sodium chloride in solid or dissolved form has many industrial uses. Commercial production in large quantities from underground deposits is carried on in many parts of the United States and the world. A common method of removing rock salt from underground deposits is to drill to the deposit, contact the salt with water, and pump the water containing the dissolved salt from the well. This is known as the brine well method. Another method is to mine the salt in dry rock form much the same as coal is mined. In this case, if a brine is desired, the dry salt may be dissolved on the surface. In either case, however, varying amounts of impurities are present in the salt and are dissolved along with the salt when it is contacted with water unless treatment is provided to inhibit the dissolution of such impurities. For some purposes the impurities are harmless but for many purposes they are undesirable for economic or other reasons. Impurities are particularly undesirable for electrolytic processes such as are used to make caustic soda, chlorine, and so forth from brines and metallic sodium and chlorine from molten sodium chloride.

The major impurity in virtually all North American rock salt is calcium sulfate (anhydrite). The amount of this material in crude rock salt may range from 1% to 3% by weight. Under ordinary conditions calcium sulfate (anhydrite) dissolves slowly during brine preparation, and may continue to dissolve for a considerable time after the sodium chloride is completely dissolved. Much effort has been expended devising various methods, of removing the calcium sulfate (anhydrite) or inhibiting its dissolution. The calcium ion may be precipitated with soda ash or sodium orthophosphate and the sulfate ion may be precipitated with a barium salt. Inhibition of the dissolution of calcium sulfate (anhydrite) may be accomplished by the methods of U.S. Patents 2,906,599 and 2,906,600, the latter of which I am co-patentee. These patents describe the preparation of pure brines by contacting impure sodium chloride with water in the presence of an alkali metal molecularly dehydrated phosphate. The use of alkali metal molecularly dehydrated phosphates (sodium tripolyphosphate, hexametaphosphate, and pyrophosphate, for example) has proved to be the most successful method heretofore devised for preparing pure brines.

I have invented a method of making exceptionally pure brines from natural rock salt or sodium chloride otherwise contaminated by calcium sulfate (anhydrite), comprising dissolving the sodium chloride in the presence of an organic anionic wetting agent. By a wetting agent, I mean a substance which has the ability to lower appreciably the surface tension of water. I may add the wetting agent to the dissolving water or I may mix the wetting agent with the crude salt prior to dissolving it. The wetting agent may be added to the salt as a film or spray. In any case, the wetting agent must be present at the time the salt is contacted with the dissolving water.

Exceptionally high quality brines are prepared in this manner. Very low concentrations of sulfate and calcium ions are found in the brine as a result of the heretofore unknown inhibiting action of the anionic wetting agents. Moreover, the effect is many times more permanent than the performance of previously known agents. The advantages of stability extend over long periods of time and at elevated temperatures. Stability under such conditions is important when, for example, brines are prepared underground by pumping water to a subsurface salt deposit, where temperatures are high and contact times of crude salt and water are long. Above ground, brines are often prepared continuously by adding large amounts of both salt and water to a storage dissolver and continuously drawing off a strong brine. Even under these conditions, where the concentration of contaminant continually builds up, remarkably pure brines with excellent stability may be continuously prepared through the use of anionic wetting agents. Also, where subsequent purification is required to eliminate the small amounts of calcium and sulfate ions which have dissolved in spite of treatment, my invention is remarkably free of interference in the usual precipitation process. Thus, my invention permits achievement of extremely pure brines with economy.

I have found that representative compounds from each of the groups of commercially recognized organic anionic wetting agents may be used in my invention. Those familiar with organic wetting agents will recognize that they may be classified according to their hydrophilic groups, their hydrophobic groups, and their intermediate linkages, if any. Among the hydrophilic groups represented in the following tables are the carboxylic acid, sulfate, sulfonic acid (alkane and alkyl aromatic), and the phosphate groups. As is known in the art, the most common hydrophobic groups are the straight alkyl chains of about 8–18 or more carbon atoms derived from natural fatty acids, the lower alkyl groups of 3–8 carbon atoms attached to aromatic nuclei such as benzene or naphthalene, petroleum hydrocarbons in the range of 8–20 carbon atoms or more, and higher alcohols and hydrocarbons, etc. The hydrophilic and hydrophobic groups are connected directly or by intermediate linkages of ether, ester, amide, etc. as represented in the following tables.

In the following demonstrations, except where otherwise noted, Detroit rock salt containing about 1.5% by weight of calcium sulfate (anhydrite), was used as the crude salt. The test brines were made by agitating one part by weight of Detroit rock salt in three parts by weight of water for five hours at room temperature. The treated brines were made by adding the anionic wetting agent or surfactant to the dissolving water prior to salt addition and agitation. The concentrations of wetting agent are given in parts by weight per million parts by weight of water. The resulting near-saturated brines were filtered before being analyzed for total hardness metal ions (as $Ca++$) using the Schwarzenbach titration method.

Throughout the tables, the column headed "percent $Ca++$ Inhibition" represents the percent of calcium which was inhibited from dissolving, and is approximately equivalent to the percentage of calcium sulfate which was inhibited from dissolving. The percent calcium inhibition was calculated by comparing the total hardness metal ion content (as $Ca++$) of the treated brine sample with the total hardness metal ion content (as $Ca++$) of the untreated brine control sample, using the following formula:

$$\frac{A-B}{A} \times 100 = \text{percent calcium inhibition}$$

where $A=736$ mg./liter, the total hardness metal ion concentration (as $Ca++$) of the control, a typical impurity level for a Detroit rock salt brine after five hours of agitation prepared in the manner described but without inhibitor treatment, and $B=$the total hardness metal ion concentration (mg./liter) in the brine treated with the anionic wetting agent of the particular test. Thus, untreated dissolving water yields a "percent Ca++ inhibition" of 0%, while completely inhibiting the dissolution of impurity would show 100% Ca++ inhibition. However, the attainment of 100% inhibition is not considered practical since small amounts of hardness metal ions (Ca, Mg, etc.) may be present in rock salt in a form other than as calcium sulfate (anhydrite). Some such compounds are much more readily soluble than calcium sulfate (anhydrite) and consequently are not expected to be inhibited. Those skilled in the art will recognize that the total hardness metal ion concentration figures on which the calculations are based will reflect the presence of small amounts of magnesium, calcium, and other hardness metal ions in other forms.

The precent inhibition results throughout the specification are not necessarily the best results obtainable in each case. Higher concentrations of many of the substances will often yield better results, although not always more economically. In addition, rock salts from some strata, other than Detroit, are treated more effectively with my invention because of smaller amounts of readily soluble impurities, particularly calcium sulfate (anhydrite) or larger particle sizes of anhydrite. The smaller the particle size of anhydrite, the more the total surface area of anhydrite in contact with the dissolving water, and the more difficult is the process of inhibition. Detroit strata rock salt is known for its high impurity content, the small size of its calcium sulfate (anhydrite) particles, and consequently also for the high degree of difficulty of its purification.

Table I shows the results of several demonstrations of my invention utilizing the above-described procedure and Detroit rock salt. Percent inhibition or holdback of impurity (as Ca++) was determined after five hours of agitation of the treated water and impure salt.

TABLE I

| Additive | Product, p.p.m. | Active, p.p.m. | Brine, mg./l. Ca++ | Percent Ca++ Inhibition |
|---|---|---|---|---|
| 1. Control (no additive) | 0 | 0 | 736 | 0 |
| 2. Sodium oleate | 40 | 40 | 508 | 31 |
| 3. "Maypon K903" | 40 | 19 | 152 | 80 |
| 4. "Sarkosyl NL97" | 20 | 19.4 | 136 | 82 |
| 5. "Sipex OP" | 40 | 28 | 510 | 31 |
| 6. "Monad G" | 40 | 12 | 408 | 43 |
| 7. "Intexol TD3" | 40 | 12 | 360 | 51 |
| 8. "Triton X301" | 80 | 16 | 596 | 19 |
| Do | 240 | 48 | 476 | 35 |
| 9. "Duponol RA" | 40 | | 280 | 62 |
| 10. "Emcol 415" | 40 | 14 | 144 | 80 |
| Do | 20 | 7 | 184 | 75 |
| 11. "Igepon AP" | 20 | 13 | 236 | 68 |
| Do | 40 | 26 | 140 | 81 |
| 12. "Igepon TK32" | 5 | 1 | 556 | 24 |
| Do | 10 | 2 | 304 | 59 |
| Do | 25 | 5 | 196 | 73 |
| Do | 40 | 8 | 152 | 79 |
| Do | 53 | 10.6 | 168 | 77 |
| Do | 80 | 16 | 135 | 82 |
| Do | 200 | 40 | 88 | 88 |
| Do | 2,000 | 400 | 40 | 94 |
| 13. "Igepon CN" | 40 | 7.2 | 164 | 78 |
| Do | 80 | 14.4 | 148 | 80 |
| Do | 120 | 21.6 | 116 | 84 |
| 14. "Igepon TN" | 20 | 8.8 | 552 | 25 |
| Do | 40 | 17.6 | 392 | 47 |
| Do | 80 | 35.2 | 320 | 57 |
| 15. "Igepon T" | 20 | 6.4 | 416 | 44 |
| Do | 40 | 12.8 | 268 | 64 |
| Do | 80 | 25.6 | 160 | 78 |
| 16. "Igepon TE" | 40 | 9.6 | 340 | 54 |
| Do | 80 | 19.2 | 328 | 55 |
| Do | 120 | 28.8 | 292 | 60 |
| 17. "Igepon TC" | 40 | 9.6 | 408 | 45 |
| Do | 80 | 19.2 | 368 | 50 |
| Do | 120 | 28.8 | 344 | 53 |
| 18. "Triton X-200" | 40 | 11 | 328 | 55 |
| 19. "Alkanol B" | 20 | | 248 | 66 |
| 20. "Nekal A" | 40 | 26 | 248 | 66 |
| 21. "Santomerse E" | 10 | 7 | 664 | 10 |
| Do | 20 | 14 | 528 | 29 |
| Do | 30 | 21 | 392 | 47 |
| Do | 40 | 28 | 328 | 55 |
| 22. "Santomerse SX" | 20 | 6 | 436 | 41 |
| Do | 40 | 12 | 308 | 58 |
| Do | 60 | 18 | 280 | 62 |
| Do | 80 | 24 | 256 | 65 |
| Do | 100 | 30 | 260 | 65 |
| 23. "Santomerse #1" | 20 | 8 | 324 | 56 |
| Do | 40 | 16 | 260 | 65 |
| Do | 60 | 24 | 280 | 62 |
| Do | 80 | 32 | 232 | 68 |
| Do | 100 | 40 | 228 | 69 |
| 24. "Regal Beads" | 20 | 7 | 324 | 56 |
| Do | 40 | 14 | 264 | 64 |
| Do | 60 | 21 | 240 | 68 |
| Do | 80 | 28 | 272 | 63 |
| Do | 100 | 35 | 244 | 67 |
| Do | 200 | 70 | 232 | 69 |
| 25. "Ultrawet SK" | 40 | 14 | 248 | 64 |
| 26. "Stephan DS-60" | 40 | 20 | 268 | 64 |
| 27. "Nacconol DBX" | 40 | 16 | 240 | 68 |
| 28. Dodecyl benzene sulfonic acid | 40 | 40 | 368 | 50 |
| 29. "Victawet 35B" | 40 | 28 | 128 | 83 |
| 30. "Victawet 58B" | 40 | 28 | 100 | 78 |
| 31. "Hyonic FA75" | 20 | 14 | 192 | 74 |

The exact chemical formulas of some of the above compositions are not available to me, but a generalized formula is sufficient for my purposes. Many of the commercial compositions contain minor amounts of similar compounds having slightly varying chain lengths. Formulas of the above compositions, to the best of my present knowledge, are presented below:

(3) "Maypon K903"—sodium salt of peptide oleic acid condensate; Maywood Chemical Works.

(4) "Sarkosyl NL97"—sodium lauroyl sarcosinate (sodium salt of

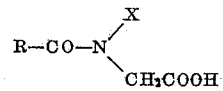

where R is a lauryl group and X is H or CH₃); Geigy Chemical Corporation.

(5) "Sipex OP"—a sulfated lauryl alcohol; American Alcolac Corporation.

(6) "Monad G"—a sulfated monoglyceride of coconut oil; Colgate-Palmolive Company.

(7) "Intexol TD3"—a tridecyl glycol ether sulfate; Intex Chemical Corporation.

(8) "Triton X301"—sodium salt of an alkyl aryl polyether sulfate; Rohm & Haas Company.

(9) "Duponol RA"—an alcohol ether sodium sulfate; E. I. du Pont de Nemours & Company.

(10) "Emcol 4150"—a fatty acid derivative of an aliphatic sulfonate; Witco Chemical Company.

(11) "Igepon AP"—the oleic acid ester of sodium isethionate:

$$C_{17}H_{33}\overset{O}{\overset{\|}{C}}-O-CH_2CH_2SO_3Na$$

Antara Chemicals.

(12) "Igepon TK32"—sodium N-methyl-N-"tall oil acid" taurate:

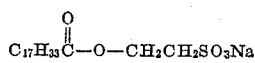

Antara Chemicals.

(13) "Igepon CN"—sodium N-cyclohexyl-N-palmitoyl taurate:

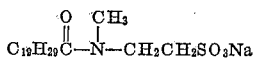

Antara Chemicals.

(14) "Igepon TN"—sodium N-methyl-N-palmitoyl taurate:

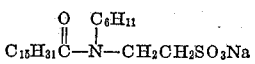

Antara Chemicals.

(15) "Igepon T"—sodium N-methyl-N-oleoyl taurate:

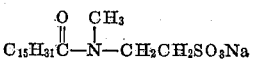

Antara Chemicals.

(16) "Igepon TE"—sodium N-methyl-N-"tallow acid" taurate:

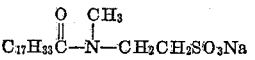

Antara Chemicals.

(17) "Igepon TC"—sodium N-coconut acid-N-methyl-taurate:

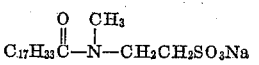

Antara Chemicals.

(18) "Triton X-200"—sodium salt of an alkyl aryl polyether sulfonate; Rohm & Haas Company.

(19) "Alkanol B"—sodium alkyl naphthalene sulfonate; E. I. du Pont de Nemours & Company.

(2) "Nekal A"—dipropylated naphthalene sulfonate; Antara Chemicals.

(21) "Santomerse E"—an alkyl benzene sodium sulfonate, the alkyl group containing about 5 carbon atoms; Monsanto Chemical Company.

(22) "Santomerse SX"—lauryl benzene sodium sulfonate; Monsanto Chemical Company.

(23) "Santomerse #1"—alkyl benzene sodium sulfonate, the alkyl group containing about 14 carbon atoms; Monsanto Chemical Company.

(24) "Regal Beads"—alkyl benzene sodium sulfonate, the alkyl group containing about 14 carbon atoms; Armour & Company.

(25) "Ultrawet SK"—alkyl benzene sodium sulfonate, the alkyl group containing about 14 carbon atoms; Atlantic Refining Company.

(26) "Stepan DS-60"—desalted sodium dodecyl benzene sulfonate; Stepan Chemical Company.

(27) "Nacconol DBX"—alkyl benzene sulfonate, the alkyl group containing about 14 carbon atoms; National Aniline & Dye Corporation.

(29) "Victawet 35B"—Na₅R₅(P₃O₁₀)₂ in which R is 2-ethyl hexyl (octyl); Victor Chemical Works.

(30) "Victawet 58B"—Na₅R₅(P₃O₁₀)₂ in which R is a capryl group; Victor Chemical Works.

(31) "Hyonic FA75"—a modified fatty alkylolamide; Nopco Chemical Company.

Compositions 12 through 16 may be represented by the general formula:

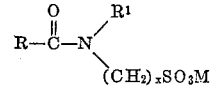

where R is an alkyl chain having about 9–19 carbon atoms, R' is selected from the group consisting of hydrogen, aliphatic and alicyclic groups having up to about 8 carbon atoms, x is an integer from 1 to 4, and M is selected from the group consisting of hydrogen and alkali metals. The sulfonic acid group may be replaced by any other hydrophilic group.

Compounds such as "Igepon AP" (Composition 11) may be represented by:

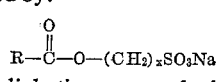

where R is an aliphatic group of about 9–21 carbon atoms, and x is an integer from 1 to 4. The hydrophilic group (SO₃Na) may be replaced by other hydrophilic groups as is known in the wetting agent art.

The various alkyl aryl sulfonic acid salts may be represented by the general formula:

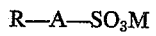

where R is an alkyl group of from about 5 to about 19 carbon atoms, A is an aryl group, and M is selected from the group consisting of hydrogen and alkali metals. Shorter alkyl groups may be used if more than one are attached to the aryl ring as in "Nekal A."

Compounds 29 and 30 may be represented by the general formula:

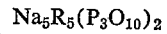

in which R is an aliphatic group.

The effectiveness of several of these anionic surface active agents in combination with a New York strata ((Retsof) rock salt and dissolving water are shown in Table II. The room temperature dissolving test covered a 20-hour agitation period, and inhibition of calcium sulfate (anhydrite) solubility was followed by the same analytical and laboratory precedures described previously. The anionic wetting agents and the method of calculating their effectiveness have also been described in earlier discussion.

TABLE II.—RETSOF ROCK SALT—ROOM TEMPERATURE—20 HOURS AGITATION

| Additive | Product (p.p.m.) | Active (p.p.m.) | Brine, mg./l. Ca++ | Percent Ca++ Inhibition |
|---|---|---|---|---|
| Control (no additive) | | | 1,140 | |
| "Igepon TK32" | 20 | 4 | 184 | 84 |
| Do | 40 | 8 | 160 | 86 |
| "Regal Beads" | 50 | 17.5 | 164 | 86 |

Also, I have found that combinations of these anionic wetting agents are compatible with each other and are very effective in combination. The superior characteristics with regard to immediate inhibition, low concentration efficiency, stability, etc. for each of several wetting agents may be combined into one all-around product. In Table III, I have summarized the effectiveness of several of these combinations when brines were prepared from one part Detroit rock salt and three parts dissolving water treated with these additives. The test solutions were agitated for five hours at room temperature and the brine quality was determined by the total hardness metal ion (as $Ca++$) titration and the percent $Ca++$ inhibition procedure previously described.

TABLE III.—DETROIT ROCK SALT—ROOM TEMPERATURE—FIVE HOURS AGITATION

| Additive | Product (p.p.m.) | Active (p.p.m.) | Brine, mg./l. Ca++ | Percent Ca++ Inhibition |
|---|---|---|---|---|
| Control (no additive) | | | 788 | 0 |
| "Igepon TK32" | 20 | 4 | 224 | 72 |
| "Regal Beads" | 20 | 7 | | |
| "Igepon TK32" | 20 | 4 | 208 | 74 |
| "Ultrawet SK" | 20 | 7 | | |
| "Igepon TK32" | 20 | 4 | 232 | 72 |
| "Nacconol DBX" | 20 | 8 | | |
| "Igepon TK32" | 20 | 4 | 224 | 72 |
| "Santomerse SX" | 20 | 6 | | |

Further demonstrations were made to show that the sulfate radical, as well as the calcium radical, was inhibited from solution in the brine. Generally speaking, the concentration of total hardness metal ions (as $Ca++$) present in the brine is a good indication of the quantity of calcium sulfate (anhydrite) impurity which is dissolved. However, I have also determined that the sulfate concentration of brines prepared in the presence of my organic wetting agents is drastically reduced in comparison to the sulfate concentration of untreated brines.

These sulfate determinations were made by means of a turbidimetric test procedure using standard curves prepared at known concentrations of sulfate and brine. Using this analytical procedure, I have confirmed the remarkable effectiveness of these organic wetting agents in inhibiting the solubility of the major rock salt impurity, calcium sulfate (anhydrite). The data recorded in Table IV were obtained in 5-hour dissolving tests using Detroit rock salt (1 part salt:3 parts water), mechanical agitation, and room temperature.

TABLE IV.—DETROIT ROCK SALT—ROOM TEMPERATURE—FIVE HOURS AGITATION

| Additive | Product (p.p.m.) | Active (p.p.m.) | Brine, mg./l. SO$_4^{--}$ | Percent SO$_4^{--}$ Inhibition |
|---|---|---|---|---|
| Control | | | 1,800 | 0 |
| "Igepon TK32" | 40 | 8 | 397 | 78 |
| "Igepon TK32" | 20 | 4 | 494 | 73 |
| "Regal Beads" | 20 | 7 | | |
| "Igepon TK32" | 20 | 4 | 455 | 75 |
| "Ultrawet SK" | 20 | 7 | | |
| "Igepon TK32" | 20 | 4 | 493 | 73 |
| "Santomerse SX" | 20 | 6 | | |
| "Igepon TK32" | 20 | 4 | 478 | 73 |
| "Nacconol DBX" | 20 | 8 | | |

Table V will demonstrate the permanence of the inhibiting action exerted by two of the preferred anionic wetting agents on the solubility of the rock salt impurities. In this room temperature test, 3 parts water treated with my anionic inhibitor and 1 part New York strata (Retsof) rock salt were agitated for 20 hours and the finished brine stored at about 25° C. Then I determined the total hardness metal ion concentration (as $Ca++$) of this brine immediately after agitation and again after 90 days storage. I also carried out the same brine preparation with no additives and found the total hardness metal ion concentration (as $Ca++$) of this untreated brine at 20 hours and 90 days. Data obtained during this stability test are shown in Table V.

TABLE V.—STORAGE AT 25° C.

| Additive | Product (p.p.m.) | Active (p.p.m.) | Mg./l. Ca++ 20 Hours | Mg./l. Ca++ 90 Days |
|---|---|---|---|---|
| Control (no additive) | | | 1,140 | 1,210 |
| "Igepon TK32" | 50 | 10 | 160 | 200 |
| "Regal Beads" | 50 | 17.5 | 164 | 204 |

Another demonstration was made to show the advantage of several of my preferred additives under relatively high temperature storage conditions. Detroit and Retsof (New York) rock salt was used for these tests, again at concentrations of 25% by weight, and the Schwarzenbach method was used to determine total hardness metal ion (as $Ca++$). No agitation was used after initially dissolving the salt, except that a short gentle stirring was applied each week prior to sampling. The samples were maintained at 55° C. (131° F.) and at 87° C. (188° F.) for the periods shown.

TABLE VI.—RETSOF ROCK SALT—STORAGE AT 55° C.—TOTAL HARDNESS METAL ION (AS Ca++) mg./l.

| Additive | Product (p.p.m.) | Active (p.p.m.) | Weeks | | | | | | | |
| | | | 0 | 2 | 4 | 6 | 8 | 11 | 13 | 19 |
|---|---|---|---|---|---|---|---|---|---|---|
| Control | | | 384 | 1,060 | 1,130 | 1,140 | | | | |
| "Igepon TK32" | 50 | 10 | 90 | 192 | 336 | 764 | | | | |
| "Regal Beads" | 50 | 17.5 | 144 | 204 | 236 | 228 | 232 | 240 | 240 | 260 |

TABLE VII.—DETROIT ROCK SALT—STORAGE AT 55° C.—TOTAL HARDNESS METAL ION (AS Ca++) MG./L.

| Additive | Product (p.p.m.) | Active (p.p.m.) | Weeks | | | | | | |
| | | | 0 | 2 | 4 | 6 | 8 | 10 | 12 |
|---|---|---|---|---|---|---|---|---|---|
| Control | | | 416 | 1,210 | 1,220 | | | | |
| "Igepon CN" | 120 | 22 | 116 | 248 | 284 | 316 | 356 | 416 | 441 |
| "Igepon TK32" | 50 | 12.5 | 100 | 344 | 396 | | | | |
| "Regal Beads" | 50 | 17.5 | 186 | 292 | 292 | 300 | 304 | 316 | 344 |
| "Ultrawet SK" | 50 | 17.5 | 192 | 292 | 288 | 304 | 304 | 376 | |

Table VIII shows the remarkable stability which my invention provides even at temperatures as high as 87° C. The tests were run on 25% by weight Detroit rock salt.

TABLE VIII.—DETROIT ROCK SALT—STORAGE AT 87° C.—TOTAL HARDNESS METAL ION (AS Ca++) MG./L.

| Additive | Product (p.p.m.) | Active (p.p.m.) | Weeks | | | | | | | |
|---|---|---|---|---|---|---|---|---|---|---|
| | | | 0 | 1 | 2 | 4 | 6 | 7 | 8 | 10 |
| Control | | | 780 | 1,020 | 1,120 | | | | | |
| "Igepon CN" | 80 | 14 | 148 | 260 | 280 | 350 | 408 | | | |
| "Igepon T" | 80 | 26 | 160 | 344 | 408 | 470 | | | | |
| "Regal Beads" | 50 | 17.5 | 256 | 416 | 436 | 460 | 500 | | 548 | |
| Do | 100 | 35 | 120 | 236 | 300 | | | | 330 | 358 |
| "Santomerse SX" | 80 | 24 | 256 | | 336 | 352 | 370 | | | |
| "Santomerse #1" | 40 | 16 | 260 | 368 | 384 | | | 480 | | |

The pH of the brine is not an important consideration as indicated by the excellent results obtained with anionic wetting agents in the absence of alkaline adjustment. On the other hand, the anionic wetting agents are compatible with alkaline adjusting materials and may be used in conjunction therewith.

As may be seen from the data, the ranges of useable concentrations of anionic wetting agents are limited only by economics and other practical considerations. As little as one part wetting agent per million parts of water will inhibit the dissolution of much larger quantities of impurity although, as the data indicates, the maximum inhibition will not be reached at such low concentrations nor will the effect be as long lasting as at higher concentrations. At the higher end of the scale, the effect of the wetting agent tends to level off with increasing concentrations. However, no harm is caused by the use of concentrations far in excess of the amount necessary to bring about the desired result. Higher concentrations are advantageous where extended time periods of inhibition are desired.

I do not intended to be limited to the presently preferred methods of practicing my invention recited in the above examples. It may be otherwise variously practiced and embodied within the scope of the following claims.

I claim:
1. A method of preparing brine from an aqueous solvent and a solid alkali-metal halide containing calcium sulphate as an impurity comprising adding to the aqueous solvent no later than simultaneous with the contact of the solvent with the halide a compound having at least one active group selected from the class consisting of sulphonate, sulphate, carboxylate, and phosphate, said active group being attached to a hydrocarbon group containing between about 5 to 19 carbon atoms per active group, said compound combining with calcium to form a product that is less soluble than calcium sulphate.

2. A method for inhibiting the dissolution of calcium sulphate into an aqueous solvent comprising dispersing into the aqueous solvent an inhibiting compound having at least one active group selected from the class consisting of sulfonate, sulfate, carboxylate, and phosphate, said active group being attached to at least one hydrocarbon group containing from about 5 to 21 carbon atoms per active group, said compound combining with calcium to form a product that is less soluble than calcium sulfate.

3. A method according to claim 2 wherein said compound is sodium dodecyl benzene sulfonate.

4. A method of preparing brine from an aqueous solvent and a solid alkali-metal halide containing calcium sulfate as an impurity comprising adding to the alkali metal halide no later than simultaneous with the contact of the solvent with the halide a compound having at least one active group selected from the class consisting of sulfonate, sulfate, carboxylate, and phosphate, said active group being attached to a hydrocarbon group containing between about 5 to 21 carbon atoms per active group, said compound combining with calcium to form a product that is less soluble than calcium sulfate.

5. A method of preparing brine from an aqueous solvent and a solid alkali metal halide containing calcium sulfate as an impurity comprising dissolving said halide in said solvent in the presence of an inhibiting compound having a hydrophobic moiety containing about 5 to 21 carbon atoms and a hydrophilic moiety containing a group of the class consisting of sulfonate, sulfate, carboxylate, and phosphate.

6. Method of claim 5 wherein the inhibiting compound is sodium dodecyl benzene sulfonate.

7. A method of preparing brine from an aqueous solvent and a solid alkali-metal halide containing calcium sulphate as an impurity comprising adding to the aqueous solvent no later than simultaneous with the contact of the solvent with the halide a compound having at least one active group selected from the class consisting of sulphonate, sulphate, carboxylate, and phosphate, said active group being attached to a hydrocarbon group containing between about 5 to 19 carbon atoms per active group.

8. Method of claim 2 in which the hydrocarbon group contains 5–19 carbon atoms per active group.

9. Method of claim 4 in which the hydrocarbon contains 5–19 carbon atoms per active group.

10. Method of claim 5 in which the hydrophobic moiety contains 5–19 carbon atoms per active group.

11. The method of preparing a sodium chloride brine of exceptional purity from solid sodium chloride contaminated by calcium sulfate (anhydrite) which comprises dissolving the contaminated sodium chloride in water in the presence of an anionic organic wetting agent of the formula R—A—SO$_3$M where R is an alkyl group of about 5 to about 19 carbon atoms, A is an aryl group, and M is selected from the group consisting of hydrogen and alkali metals.

12. The method of preparing a sodium chloride brine of exceptional purity from solid sodium chloride contaminated by calcium sulfate (anhydrite) which comprises dissolving the contaminated sodium chloride in water in the presence of an anionic organic wetting agent of the formula $$R-\overset{O}{\underset{\|}{C}}-R'$$

in which R is an aliphatic group of about 9–21 carbon atoms, and R' is selected from the group consisting of $$-O-(CH_2)_xY \text{ and } -N\begin{matrix}R''\\ (CH_2)_xY\end{matrix}$$

where $x$ is an integer from 1 to 4, Y is a hydrophilic radical, and R'' is selected from the group consisting of hydrogen, aromatic, and alkyl groups of up to about 10 carbon atoms.

13. The method of preparing a sodium chloride brine of exceptional purity from solid sodium chloride contaminated by calcium sulfate (anhydrite) which comprises dissolving the contaminated sodium chloride in water in the presence of an anionic organic wetting agent of the formula $Na_5R_5(P_3O_{10})_2$ in which R is an alkyl group.

References Cited

UNITED STATES PATENTS

| | | | |
|---|---|---|---|
| 2,026,816 | 1/1936 | Bertsch | 252—121 X |
| 2,539,012 | 1/1951 | Diamond et al. | 23—89 X |
| 2,845,337 | 7/1958 | Meyers | 210—58 X |
| 2,906,599 | 9/1959 | Roland | 23—89 X |
| 2,964,467 | 12/1960 | Lambert et al. | 210—58 |
| 3,024,612 | 3/1962 | Ludeman | 262—3 X |
| 3,140,915 | 7/1964 | Axelrad | 23—312 X |

OTHER REFERENCES

Martell and Calvin: Chemistry of the Metal Chelate Compounds, Prentice-Hall, Inc., 1956, pp. 491–495 and 514–561.

NORMAN YUDKOFF, *Primary Examiner.*

JAMES H. TAYMAN, JR., *Examiner.*

S. J. EMERY, *Assistant Examiner.*